United States Patent
Shirane et al.

(10) Patent No.: US 7,892,677 B2
(45) Date of Patent: Feb. 22, 2011

(54) NEGATIVE ELECTRODE FOR NON-AQUEOUS ELECTROLYTE SECONDARY BATTERIES, AND NON-AQUEOUS ELECTROLYTE SECONDARY BATTERY HAVING THE SAME

(75) Inventors: Takayuki Shirane, Osaka (JP); Katsumi Kashiwagi, Osaka (JP); Kaoru Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 730 days.

(21) Appl. No.: 11/664,805

(22) PCT Filed: Oct. 19, 2006

(86) PCT No.: PCT/JP2006/320824
§ 371 (c)(1), (2), (4) Date: Apr. 6, 2007

(87) PCT Pub. No.: WO2007/069389
PCT Pub. Date: Jun. 21, 2007

(65) Prior Publication Data
US 2009/0004566 A1    Jan. 1, 2009

(30) Foreign Application Priority Data
Dec. 13, 2005    (JP) ............................. 2005-358754

(51) Int. Cl.
*H01M 4/02* (2006.01)
*H01M 4/38* (2006.01)
*H01M 4/58* (2010.01)
*H01M 4/62* (2006.01)
*H01M 4/64* (2006.01)

(52) U.S. Cl. ................. 429/218.1; 429/231.95
(58) Field of Classification Search ............. 429/218.1, 429/231.95
See application file for complete search history.

(56) References Cited

U.S. PATENT DOCUMENTS 5,571,638 A * 11/1996 Satoh et al. ................. 429/248
5,783,331 A *  7/1998 Inoue et al. ................. 429/217
6,440,610 B1   8/2002 Sheem et al.

(Continued)

FOREIGN PATENT DOCUMENTS

JP          11-354126 A        12/1999

(Continued)

OTHER PUBLICATIONS

IPDL Machine Translation of JP 2004-349056A (Dec. 2004).*

(Continued)

*Primary Examiner*—Gregg Cantelmo
(74) *Attorney, Agent, or Firm*—McDermott Will & Emery LLP (57) ABSTRACT

A negative electrode for non-aqueous electrolyte secondary batteries has a mixture layer disposed on a current collector. The mixture layer includes a composite negative electrode active material, a first binder containing an acryl-group-containing polymer, and a second binder containing adhesive rubber particles. The composite negative electrode active material contains carbon nanofibers, a catalyst element, and silicon-containing particles capable of charging and discharging at least lithium ions. The first binder binds the silicon-containing particles to the current collector, and the second binder binds the carbon nanofibers together.

5 Claims, 2 Drawing Sheets

U.S. PATENT DOCUMENTS

| | | | |
|---|---|---|---|
| 6,773,838 B2 * | 8/2004 | Suzuki et al. | 429/21 |
| 2002/0061440 A1 * | 5/2002 | Suzuki et al. | 429/217 |
| 2003/0054243 A1 * | 3/2003 | Suzuki et al. | 429/188 |
| 2003/0087152 A1 * | 5/2003 | Shindo et al. | 429/217 |
| 2006/0115730 A1 * | 6/2006 | Taniguchi et al. | 429/217 |
| 2007/0092796 A1 * | 4/2007 | Matsuda et al. | 429/217 |
| 2007/0111102 A1 * | 5/2007 | Inoue et al. | 429/232 |

FOREIGN PATENT DOCUMENTS

| | | | |
|---|---|---|---|
| JP | 2001-196064 A | | 7/2001 |
| JP | 2002260637 A | * | 9/2002 |
| JP | 2004214046 A | * | 7/2004 |
| JP | 2004-349056 A | | 12/2004 |
| JP | 2005-263616 A | | 9/2005 |
| JP | 2005-272261 A | | 10/2005 |
| JP | 2006-339093 A | | 12/2006 |

OTHER PUBLICATIONS

IPDL Machine Translation of JP 11354126A (Dec. 1999).*

Peformance binder for lithium ions. Advanced Battery Technology, Feb. 2003, one page . Obtained from the following web address: http://findarticles.com/p/articles/mi_qa3864/is_200302/ai_n9197361/?tag=content;col1.*

* cited by examiner

FIG. 4

NEGATIVE ELECTRODE FOR NON-AQUEOUS ELECTROLYTE SECONDARY BATTERIES, AND NON-AQUEOUS ELECTROLYTE SECONDARY BATTERY HAVING THE SAME

RELATED APPLICATIONS

This application is the U.S. National Phase under 35 U.S.C. §371 of International Application No. PCT/JP2006/320824, filed on Oct. 19, 2006, which in turn claims the benefit of Japanese Application No. 2005-358754, filed on Dec. 13, 2005, the disclosures of which Applications are incorporated by reference herein.

TECHNICAL FIELD

The present invention relates to a negative electrode for non-aqueous electrolyte secondary batteries, and more particularly to a technology for extending the life of a negative electrode using a composite negative electrode active material containing silicon-containing particles as active material cores.

BACKGROUND ART

With the advancement of portable and cordless electronic instruments, growing expectation has been directed to non-aqueous electrolyte secondary batteries smaller in size, lighter in weight, and higher in energy density. In non-aqueous electrolyte secondary batteries, carbon materials such as graphite are used as a negative electrode active material in practical applications. However, carbon materials have a theoretical capacity density of as low as 372 mAh/g. In order to increase the energy density of non-aqueous electrolyte secondary batteries, an attempt has been made where as the negative electrode active material are used silicon (Si), tin (Sn), germanium (Ge), an oxide thereof, and an alloy thereof which can form alloys with lithium. These materials have a higher theoretical capacity density than carbon materials. In particular, silicon-containing particles such as silicon particles and silicon oxide particles have been widely studied because they are less expensive.

However, when these materials are used as a negative electrode active material and are subjected to repeated charging and discharging, the particles of the negative electrode active material change their volume. This change in volume causes the active material particles to be collapsed into fine particles, thereby lowering the conductivity among the particles. As a result, satisfactory charge-discharge cycle characteristics (hereinafter, cycle characteristics) are not attained.

Japanese Patent Unexamined Publication No. 2004-349056, for example, discloses a technology using composite particles (composite negative electrode active material) produced as follows: active material particles containing metal or semimetal that can form lithium alloys are used as the cores (active material cores), and a plurality of carbon fibers are bound to each of the active material cores. It has been reported that this structure can ensure the conductivity even if the active material particles change in volume, thereby maintaining sufficient cycle characteristics. Negative electrodes having high capacity and high functionality are considered to be structured, for example, by using a technology for adequately combining binders that are disclosed in Japanese Patent Unexamined Publication No. H11-354126, in addition to the former technology.

However, only by mixing a plurality kinds of binders, it is difficult to avoid such an accident that a mixture layer containing the composite negative electrode active material is peeled off from a negative electrode current corrector by an action of stress generated when the composite negative electrode active material expands and contracts. It is also difficult to prevent the composite negative electrode active material from dropping off from the mixture layer. This is probably because the surface physical property of silicon-containing particles is different from that of carbon fibers. Negative electrodes having a mixture layer with sufficient binding force are difficult to be produced only by mixing a plurality kinds of binders without considering these surface physical properties.

SUMMARY OF THE INVENTION

The present invention provides a negative electrode for non-aqueous electrolyte secondary batteries having high cycle characteristics, and a non-aqueous electrolyte secondary battery having the negative electrode. In the negative electrode, the increase in impedance of the whole negative electrode is suppressed by maintaining the binding force among composite negative electrode active materials in a mixture layer, and also by maintaining the binding force between the mixture layer and a current collector. The negative electrode for non-aqueous electrolyte secondary batteries of the present invention has a current collector and a mixture layer. The mixture layer contains a composite negative electrode active material, a first binder, and a second binder. The mixture layer is formed on the current collector. The composite negative electrode active material contains a silicon-containing particle capable of charging and discharging at least lithium ions, a carbon nanofiber (hereinafter, CNF), and a catalyst element. The CNF is attached to the surfaces of the silicon-containing particle. The catalyst element is at least one selected from the group consisting of copper (Cu), iron (Fe), cobalt (Co), nickel (Ni), molybdenum (Mo) and manganese (Mn), and promotes the growth of the CNF. The first binder is composed of an acryl-group-containing polymer. The second binder is composed of an adhesive rubber particle. The first binder binds the silicon-containing particle to the current collector, and the second binder binds CNFs together. The first binder has a high affinity to the silicon-containing particle, and the second binder has a high affinity to the CNF. Similarly to the silicon-containing particle, the current collector has a high affinity to the first binder. Each composite negative electrode active material containing the CNF is bound together by the second binder, and the composite negative electrode active material is bound to the current collector through intermediately existing chemical bonds provided by the first binder. Binding in the mixture layer and binding of the mixture layer to the current collector become tight. Therefore, even if the silicon-containing particles expand and contract during charge and discharge, the conductive structure in the mixture layer and the conductive structure between the mixture layer and the current collector are kept. As a result, the cycle characteristics are improved.

The present invention further provides a non-aqueous electrolyte secondary battery employing a negative electrode containing the aforementioned composite negative electrode active material.

DETAILED DESCRIPTION OF PREFERRED EMBODIMENTS

An exemplary embodiment of the present invention will be described hereinafter with reference to drawings. The present invention is not limited to the following description except for its fundamental features.

Figure 1:
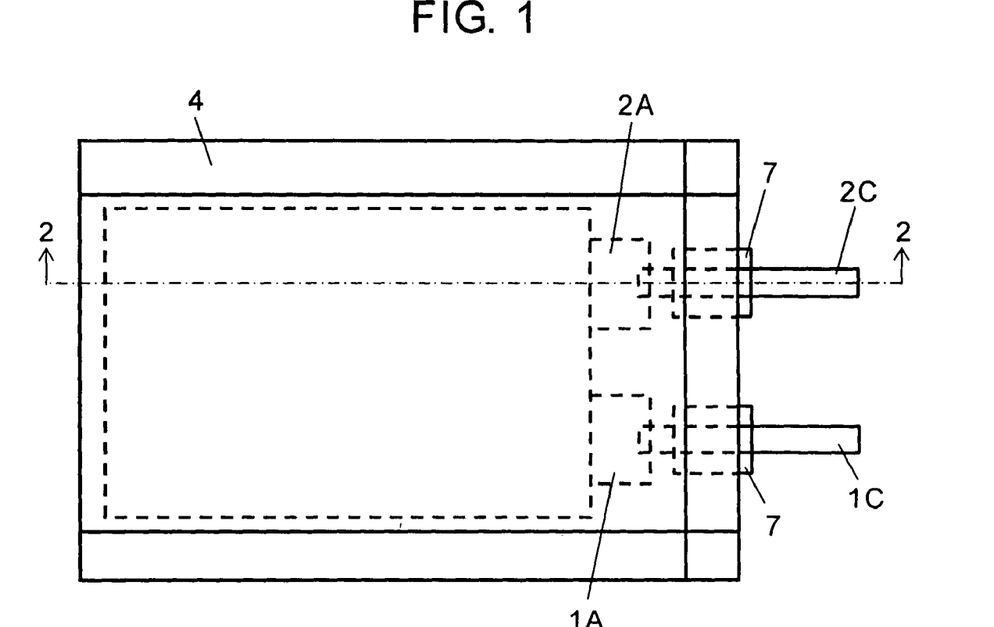
FIG. 1 is a transparent plan view showing a structure of a model cell in accordance with an exemplary embodiment of the present invention.
Figure 2:
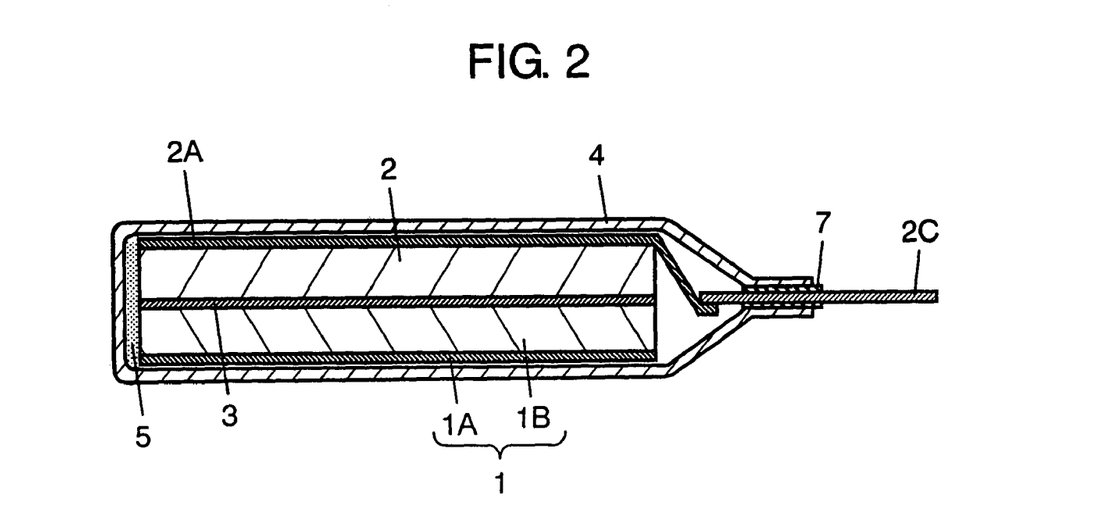
FIG. 2 is a sectional view of the model cell shown in FIG. 1 taken along line 2-2.
Figure 3:
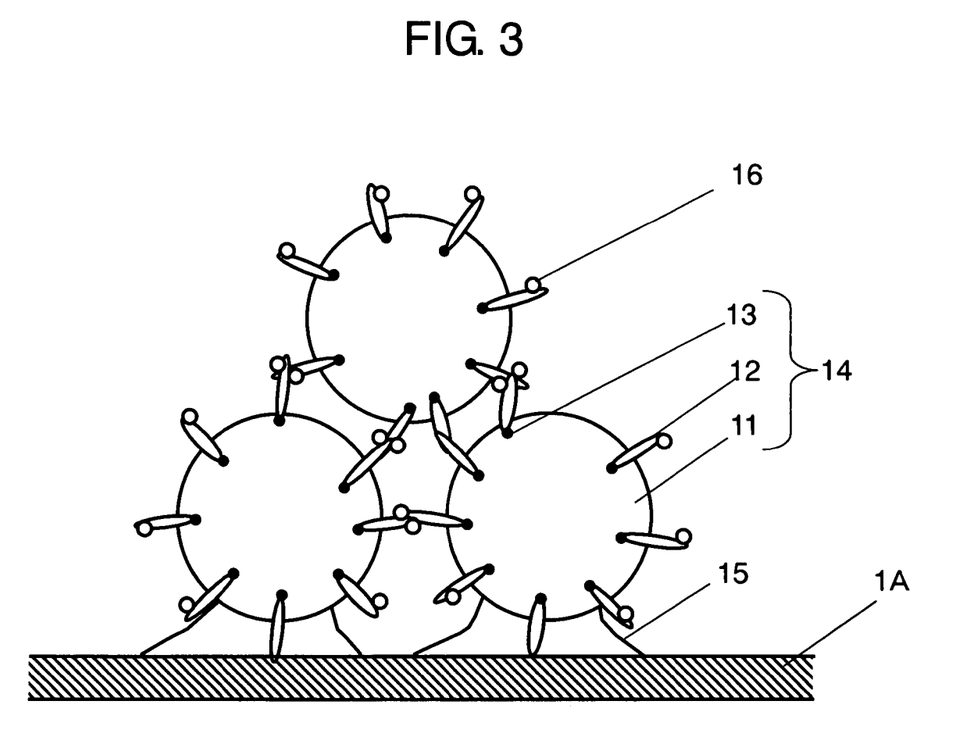
FIG. 3 is a schematic sectional view showing a structure of a mixture layer near a current collector of a negative electrode for non-aqueous electrolyte secondary batteries in accordance with the exemplary embodiment of the present invention.

FIG. 1 is a transparent plan view showing the structure of a model cell produced to evaluate a negative electrode for non-aqueous electrolyte secondary batteries of an exemplary embodiment of the present invention. FIG. 2 is a cross sectional view taken along line 2-2. FIG. 3 is a schematic diagram showing a structure of a mixture layer near a current collector.

Negative electrode 1 shown in FIGS. 1 and 2 has mixture layer 1B that is disposed on current collector 1A and electrically connected to current collector 1A. As shown in FIG. 3, mixture layer 1B contains an assembly of composite negative electrode active material 14. Each assembly of composite negative electrode active material 14 contains a silicon-containing particle 11 capable of charging and discharging lithium ions, and a number of carbon nanofibers (hereinafter, CNFs) 12 attached to silicon-containing particle 11. CNFs 12 are grown using, as a core, catalyst element 13 which is dispersed and supported on the surface of silicon-containing particle 11. Catalyst element 13 is at least one selected from the group consisting of copper (Cu), iron (Fe), cobalt (Co), nickel (Ni), molybdenum (Mo), and manganese (Mn), and promotes the growth of CNFs 12. Mixture layer 1B further contains first binder 15 composed of an acryl-group-containing polymer and second binder 16 composed of adhesive rubber particles. First binder 15 binds silicon-containing particle 11 to current collector 1A, and second binder 16 binds CNFs 12 together.

Counter electrode 2 made of metallic lithium is faced to negative electrode 1 via separator 3. Current collector 2A is bonded to counter electrode 2 on the side opposite to separator 3. These components are accommodated in laminate bag 4. Laminate bag 4 is also filled with non-aqueous electrolyte 5 and sealed. In other words, non-aqueous electrolyte 5 is interposed between negative electrode 1 and counter electrode 2. Current collectors 1A and 2A are connected with leads 1C and 2C extended to the outside of the cell, respectively. Leads 1C and 2C are heat-welded together with modified polypropylene film 7 placed at the opening of laminate bag 4, so that laminate bag 4 is sealed.

Next, composite negative electrode active material 14 is described in detail. Silicon-containing particle 11 can be made of Si or SiOx (where, $0.05 \leq x \leq 1.95$, preferably $0.3 \leq x \leq 1.3$), or can be made of an alloy, a compound, a solid solution or the like in which Si is partly replaced with at least one element selected from B, Mg, Ni, Ti, Mo, Co, Ca, Cr, Cu, Fe, Mn, Nb, Ta, V, W, Zn, C, N, and Sn.

Silicon-containing particles 11 may be composed of one kind or a plurality kinds of the above-mentioned materials. Examples of silicon-containing particles 11 composed of the plurality kinds include a compound containing silicon, oxygen, and nitrogen, and a composite of a plurality of compounds containing silicon and oxygen in different ratios. Thus, silicon-containing particles 11 contain at least one selected from the group consisting of pure silicon, a silicon-containing alloy, a silicon-containing compound, and a silicon-containing solid solution. The shapes and kinds of silicon-containing particles 11 and magnitudes of the expansion and contraction are not especially limited. Of these, SiOx is desirable because its discharge capacity density is large and its expansion coefficient during charge is smaller than that of pure silicon.

CNFs 12 attach to the surface of each silicon-containing particle 11 where they start to grow. In other words, CNFs 12 attach directly to the surface of silicon-containing particle 11 without a binder therebetween. In some growing conditions, CNFs 12 may be chemically bonded to the surface of silicon-containing particle 11 at least at one end thereof which is the starting point of the growth. This reduces the resistance to current collection and assures high electronic conductivity in the battery, thereby providing sufficient charge-discharge characteristics. In a case where CNFs 12 attach to silicon-containing particle 11 via catalyst element 13, CNFs 12 hardly become detached from silicon-containing particle 11. Therefore, negative electrode 1 becomes more resistant to a rolling load, namely a mechanical load that is applied to the negative electrode when the negative electrode is rolled to increase filling density thereof.

In order to allow catalyst element 13 to exhibit sufficient catalytic activity until CNFs 12 are fully grown, catalyst element 13 is preferably present in a metallic state in the surface parts of silicon-containing particles 11. Catalyst element 13 is preferably present in the form of metal particles having a diameter of 1 nm to 1000 nm, for example. On the other hand, when the growth of CNFs 12 is complete, the metal particles of catalyst element 13 are preferably oxidized.

CNFs 12 have a fiber length of preferably 1 nm to 1 mm, and more preferably 500 nm to 100 μm. When the fiber length is less than 1 nm, the effect to increase electrode conductivity is too small. In contrast, the fiber lengths of over 1 mm tend to reduce the active material density or capacity of the electrode. Although not limited, CNFs 12 are preferably in the form of at least one selected from the group consisting of tube-shaped carbon, accordion-shaped carbon, plate-shaped carbon, and herringbone-shaped carbon. CNFs 12 may absorb catalyst element 13 during their growth. CNFs 12 have a fiber diameter of preferably 1 nm to 1000 nm, and more preferably 50 nm to 300 nm.

Catalyst element 13 in a metallic state works as an active site to grow CNFs 12. More specifically, CNFs 12 start to grow when silicon-containing particles 11 having catalyst element 13 that is exposed in a metallic state on their surfaces are introduced into a high-temperature atmosphere containing the source gas of CNFs 12. When silicon-containing particles 11 have no catalyst element 13 on their surfaces, CNFs 12 do not grow.

Methods for forming metal particles composed of catalyst element 13 on the surfaces of silicon-containing particles 11 are not particularly limited; however, one preferable method is to support metal particles on the surfaces of silicon-containing particles 11.

When the metal particles are supported in this method, it is possible to mix silicon-containing particles 11 with the metal particles in solid form; however, it is preferable to soak silicon-containing particles 11 in a solution dissolving a metal compound serving as the source material of the metal particles in an appropriate solvent. After silicon-containing particles 11 are soaked in the solution, the solvent is removed from silicon-containing particles 11, and then they are heated if necessary. In this way, can be obtained silicon-containing particles 11 which support, on their surfaces, metal particles composed of catalyst element 13 having a diameter of 1 nm to 1000 nm, preferably 10 nm to 100 nm, in a highly and uniformly dispersed state.

It is difficult to form the metal particles of catalyst element 13 having a diameter of less than 1 nm. When the diameter exceeds 1000 nm, the metal particles are extremely uneven in size, making CNFs 12 difficult to grow. It is therefore difficult to form a highly conductive negative electrode. In this way, the diameter of the metal particles of catalyst element 13 is preferably 1 nm or more and 1000 nm or less.

Specific examples of the metal compound to provide the aforementioned solution include nickel nitrate, cobalt nitrate, iron nitrate, copper nitrate, manganese nitrate, and hexaammonium heptamolybdate tetrahydrate. The solvent used for the solution can be appropriately selected from water, an organic solvent, and a mixture of water and an organic solvent, in consideration of the solubility of the metal compound and the compatibility of the compound with the electrochemical active phases contained in silicon-containing particles 11. The electrochemical active phases mean, of crystal phases or amorphous phases composing silicon-containing particles 11, the crystal phases or amorphous phases metallic phases and metallic oxide phases that allow an oxidation-reduction reaction accompanied by electron transfer, namely a battery reaction. Specific examples of the organic solvent include ethanol, isopropyl alcohol, toluene, benzene, hexane, and tetrahydrofuran.

Alternatively, it is also possible to synthesize alloy particles containing catalyst element 13 and to use them as silicon-containing particles 11. In this case, alloys of silicon and catalyst element 13 are synthesized by a common alloying method. The silicon element reacts electrochemically with lithium to form alloys, thereby forming the electrochemical active phases. The metallic phases of catalyst element 13 are at least partly exposed in the form of particles having a diameter of 10 nm to 100 nm, for example, on the surfaces of the alloy particles.

The content of the metal particles or metallic phases of catalyst element 13 is preferably 0.01 wt % to 10 wt % of silicon-containing particles 11, more preferably 1 wt % to 3 wt %. When the content of the metal particles or the metallic phases is too low, it takes a lot of time to grow CNFs 12, thereby decreasing production efficiency. In contrast, when the content is too high, catalyst element 13 agglomerates and grows CNFs 12 uneven and having large fiber diameters. This leads to decrease in conductivity and active material density of mixture layer 1B. This also leads to relative decrease in the proportion of the electrochemical active phases, making it difficult to use composite negative electrode active material 14 as a high-capacity electrode material.

The following is a description of a method for producing composite negative electrode active material 14 composed of silicon-containing particles 11, CNFs 12, and catalyst element 13. This production method includes the following four steps of (a) to (d).

(a) A step of loading catalyst element 13 at least in the surface parts of silicon-containing particles 11 which can charge and discharge lithium ions. Catalyst element 13 is at least one selected from Cu, Fe, Co, Ni, Mo, and Mn, and promotes the growth of CNFs 12.

(b) A step of growing CNFs 12 on the surface of silicon-containing particle 11 in an atmosphere containing carbon-containing gas and hydrogen gas.

(c) A step of sintering silicon-containing particles 11 with CNFs 12 attached thereto in an inert gas atmosphere at 400° C. or higher and 1600° C. or lower.

(d) A step of crushing silicon-containing particle 11 with CNFs 12 attached thereto to adjust the tap density thereof to 0.42 g/cm$^3$ or more and 0.91 g/cm$^3$ or less.

After Step (c), composite negative electrode active material 14 may be subjected to heat treatment in the air at 100° C. or higher and 400° C. or lower to oxidize catalyst element 13. The heat treatment at this temperature range can oxidize only catalyst element 13 without oxidizing CNFs 12.

The method of loading catalyst element 13 on the surfaces of silicon-containing particles 11 at Step (a) is not limited especially. However, there may be mentioned, a step of supporting the metal particles of catalyst element 13 on the surfaces of silicon-containing particles 11, a step of reducing the surfaces of silicon-containing particles 11 containing catalyst element 13, a step of synthesizing alloy particles of silicon and catalyst element 13, and other steps.

The following is a description of conditions when CNFs 12 are grown on the surfaces of silicon-containing particles 11 at Step (b). CNFs 12 start to grow when silicon-containing particle 11 having catalyst element 13 at least in the surface part thereof is introduced into a high-temperature atmosphere containing the source gases of CNFs 12. For example, silicon-containing particles 11 are put in a ceramic reaction vessel and heated to high temperatures of 100° C. to 1000° C., preferably to 300° C. to 600° C., in an inert gas or a gas having a reducing power. Then, carbon-containing gas and hydrogen gas, which are the source gases of CNFs 12, are introduced into the reaction vessel. When the temperature in the reaction vessel is lower than 100° C., CNFs 12 either do not grow or grow very slowly, thereby damaging the productivity. In contrast, when the temperature in the reaction vessel exceeds 1000° C., the source gases are decomposed rapidly to make it harder to grow CNFs 12.

The source gases are preferably a mixture gas of carbon-containing gas and hydrogen gas. Specific examples of the carbon-containing gas include methane, ethane, ethylene, butane, and carbon monoxide. The molar ratio (volume ratio) of the carbon-containing gas in the mixture gas is preferably 20% to 80%. When catalyst element 13 in a metallic state is not exposed on the surfaces of silicon-containing particles 11, the reduction of catalyst element 13 and the growth of CNFs 12 can be performed in parallel by regulating the hydrogen gas at a high proportion in the mixture gas. When the growth of CNFs 12 is terminated, the mixture gas of the carbon-containing gas and hydrogen gas is replaced with an inert gas, and the inside of the reaction vessel is cooled to room temperature.

Next, in Step (c), silicon-containing particles 11 having CNFs 12 attached thereto are sintered in an inert gas atmosphere at 400° C. or higher and 1600° C. or lower. This sintering is preferable because it can improve crystallinity of CNFs 12, suppress the irreversible reaction which progresses at the initial charge of the battery between electrolyte 5 and CNFs 12, and hence achieve excellent charge-discharge efficiency of the battery. When such sintering process is either not performed or performed at a temperature lower than 400° C., the irreversible reaction may not be suppressed, decreasing the charge-discharge efficiency of the battery. In contrast, when sintering temperatures exceed 1600° C., the electrochemical active phases of silicon-containing particles 11 react with CNFs 12 and may be inactivated or reduced, so that the charge-discharge capacity of the battery may be decreased. For example, when the electrochemical active phases of silicon-containing particles 11 are made of silicon, the silicon reacts with CNFs 12 to generate inert silicon carbide, thereby decreasing the charge-discharge capacity of the battery. When silicon-containing particles 11 are made of silicon, the sintering temperature is particularly preferably 1000° C. or higher and 1600° C. or lower. Some growth conditions of Step (b) can achieve CNFs 12 of high crystallinity. Improving the crystallinity of CNFs 12 suppresses the irreversible reaction between electrolyte 5 and CNFs 12, as discussed above. In the case where CNFs 12 of high crystallinity are obtained at Step (b), Step (c) is not always necessary.

After being sintered in the inert gas, composite negative electrode active material 14 is preferably heat-treated in the air at 100° C. or higher and 400° C. or lower in order to oxidize at least parts (surfaces, for example) of the metal particles or metallic phases of catalyst element 13. When the heat-treatment temperature is lower than 100° C., it is difficult to oxidize the metal. When the temperature exceeds 400° C., grown CNFs 12 may burn.

In Step (d), sintered silicon-containing particles 11 with CNFs 12 attached thereto are crushed. Crushing is preferred, because composite negative electrode active material 14 of sufficient filling property is obtained. However, when the tap density of the particles is 0.42 g/cm$^3$ or more and 0.91 g/cm$^3$ or less without crushing, crushing is not always necessary. In other words, when silicon-containing particles with sufficient filling property are used as a source material, Step (d) is not always necessary.

The following is a description of a method for producing negative electrode 1. Composite negative electrode active material 14 composed of silicon-containing particles 11 having CNFs 12 on their surfaces are mixed with first binder 15, second binder 16, and a solvent to prepare a negative electrode mixture slurry.

First binder 15 is a polymer containing an acryl group as described above. Specifically, an example of first binder 15 includes polyacrylic acid, polyacrylic ester, polymethacrylic acid, and polymethacrylic ester. Especially, polyacrylic acid and polymethacrylic acid that contain a carboxyl group are preferable because the hydrogen atom contained in the carboxyl group form hydrogen bond with metallic atoms to provide a high binding force.

Second binder 16 is an adhesive rubber particle. An example of second binder 16 includes styrene-butadiene copolymer (SBR). Especially, core-shell-type modified SBR that is designed so that the core has elasticity and the shell has adhesion is more preferable.

Examples of the solvent include N-methyl-2-pyrrolidone (NMP) and water.

The obtained slurry is applied to both surfaces of current collector 1A using a doctor blade, and dried, thereby forming mixture layer 1B on current collector 1A. At this time, appropriate adjustment of the drying condition can provide a structure where first binder 15 binds silicon-containing particles 11 to current collector 1A, and second binder 16 binds CNFs 12 together. Specifically, the temperature and air flow are adjusted during drying. Second binder 16 having the property of moving with evaporating solvent accumulate more on the portion of mixture layer 1B relatively close to the surface thereof as compared with the vicinity of current collector 1A. As a result, a structure where first binder 15 binds silicon-containing particles 11 to current collector 1A is obtained.

Then, mixture layer 1B is rolled to adjust its thickness. The obtained long strip of negative electrode is either stamped or cut into a predetermined size. Lead 8 made of nickel or copper is connected to the exposed part of current collector 1A, for example by welding or the other methods, to complete negative electrode 1.

Current collector 1A can be a metal foil made of stainless steel, nickel, copper, or titanium, or a thin film made of carbon or a conductive resin. Current collector 1A may also be surface-treated with carbon, nickel, titanium, or the like.

Examples of nonaqueous electrolyte 5 can include an electrolyte solution dissolving a solute in an organic solvent and a polymer electrolyte where the electrolyte solution is immobilized with a polymer. When the electrolyte solution is used, it is desirable that separator 3 be interposed between counter electrode 2 and negative electrode 1 and is impregnated with the electrolyte solution. Separator 3 is formed of non-woven fabric or micro porous film made of polyethylene, polypropylene, aramid resin, amide-imide, polyphenylene sulfide, or polyimide. The inside or surface of separator 3 may contain a heat-resistant filler such as alumina, magnesia, silica, and titania. Besides separator 3, a heat-resistant layer that is made of these fillers and the same binder as that used in the electrode may be disposed.

The material of nonaqueous electrolyte 5 is selected based on oxidation-reduction potential of active material, and others. Examples of the solute preferably used in nonaqueous electrolyte 5 include the following materials: $LiPF_6$; $LiBF_4$; $LiClO_4$; $LiAlCl_4$; $LiSbF_6$; $LiSCN$; $LiCF_3SO_3$; $LiCF_3CO_2$; $LiAsF_6$; $LiB_{10}Cl_{10}$; lower aliphatic lithium calboxylate; LiF; LiCl; LiBr; LiI; chloroborane lithium; various borates such as bis(1,2-benzendiolate (2-)-O,O') lithium borate, bis(2,3-naphthalenediolate (2-)-O,O') lithium borate, bis(2,2'-biphenyldiolate (2-)-O,O') lithium borate, and bis(5-fluoro-2-olate-1-benzensulfonic acid-O,O') lithium borate; and various salts generally used in a lithium battery such as $(CF_3SO_2)_2NLi$, $LiN(CF_3SO_2)(C_4F_9SO_2)$, $(C_2F_5SO_2)_2NLi$, and tetraphenyl lithium borate.

The organic solvent for dissolving the solute is a solvent generally used in a lithium battery such as one or a mixture of the following solvents: ethylene carbonate; propylene carbonate; butylene carbonate; vinylene carbonate; dimethyl carbonate; diethyl carbonate; ethyl methyl carbonate; dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxymethane; tetrahydrofuran derivatives such as tetrahydrofuran and 2-methyl-tetrahydrofuran; dimethyl sulfoxide; dioxolane derivatives such as 1,3-dioxolane and 4-methyl-1,3-dioxolane; formamide; acetamide; dimethylformamide; acetonitrile; propylnitrile; nitromethane; ethylmonoglyme; triester phosphate; acetate ester; propionate ester; sulfolane; 3-methyl-sulfolane; 1,3-dimethyl-2-imidazolidinone; 3-methyl-2-oxazolidinone; a propylene carbonate derivative; ethyl ether; diethyl ether; 1,3-propane sultone; anisole; and fluorobenzene.

The solvent may further contain an additive such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl.

Nonaqueous electrolyte 5 may be used in the form of solid polymer electrolyte by mixing or dissolving the solute into one or a mixture of the following polymer materials: polyethylene oxide; polypropylene oxide; polyphosphazene; polyaziridine; polyethylene sulfide; polyvinyl alcohol; polyvinylidene fluoride; polyhexafluoropropylene and the like.

The solid polymer electrolyte may be used in a gel form by being mixed or dissolved into the above-mentioned organic solvent. The solid electrolyte made of an inorganic material such as the following material may be used: lithium nitride; lithium halide; lithium oxoate; $Li_4SiO_4$; $Li_4SiO_4$—LiI—LiOH; $Li_3PO_4$—$Li_4SiO_4$; $Li_2SiS_3$; $Li_3PO_4$—$Li_2S$—$SiS_2$; a phosphorus sulfide compound and the like.

Laminate bag 4 is made of a sheet produced by laminating a hot-melt resin film such as polyethylene on at least one side of a metal foil such as an aluminum foil. The sheet is processed in a bag shape so that the hot-melt resin film forms the inner surface of the bag. The hot-melt resin film on the inner surface is thermally welded to itself, thereby sealing the inside of laminate bag 4.

As shown in FIG. 3, mixture layer 1B contains composite negative electrode active material 14, first binder 15 composed of an acryl-group-containing polymer, and second binder 16 composed of adhesive rubber particles. First binder 15 binds silicon-containing particles 11 to current collector 1A, and second binder 16 binds CNFs 12 together.

When only first binder 15 composed of an acryl-group-containing polymer are used as a binder, silicon-containing particles 11 are bound to current collector 1A, but each assembly of composite negative electrode active material 14 is hardly bound together. Composite negative electrode active material 14 can be therefore apt to separate from mixture layer 1B during charge and discharge. When only second binder 16 composed of adhesive rubber particles is used as a binder, each assembly of composite negative electrode active material 14 is bound together via CNFs 12, but is hardly bound to current collector 1A. A large part of mixture layer 1B is peeled off from current collector 1A during charge and discharge. Even when first binder 15 and second binder 16 are simply mixed and uniformly dispersed (distributed) in mixture layer 1B, the property of each binder is not sufficiently exhibited and hence a large part of mixture layer 1B is peeled off from current collector 1A during charge and discharge. Therefore, it is essential that first binder 15 binds silicon-containing particles 11 to current collector 1A and that second binder 16 binds CNFs 12 together.

The surface of current collector 1A is preferably roughened. The area to which first binder 15 having a high affinity to current collector 1A sticks increases, so that the binding property of current collector 1A improves, and that the cycle characteristics improve. Examples of the roughening method include a sandblast method, plating at a high current density, and chemical etching. It is desirable that the surface obtained by roughening have a roughness of 1 μm or more and 5 μm or less.

For effectively preventing peeling off of mixture layer 1B from current collector 1A caused by expansion and contraction of composite negative electrode active material 14, it is desirable that the content of first binder 15 having a high affinity to current collector 1A be made higher near current collector 1A than in other part in mixture layer 1B. The other part means the positions closer to the surface of mixture layer 1B. Specifically, several kinds of negative electrode mixture slurry having different contents of first binder 15 are prepared, and the slurry is applied to current collector 1A in the descending order of the contents of first binder 15. Thus, the content of first binder 15 can be made to be higher near current collector 1A.

Figure 4:
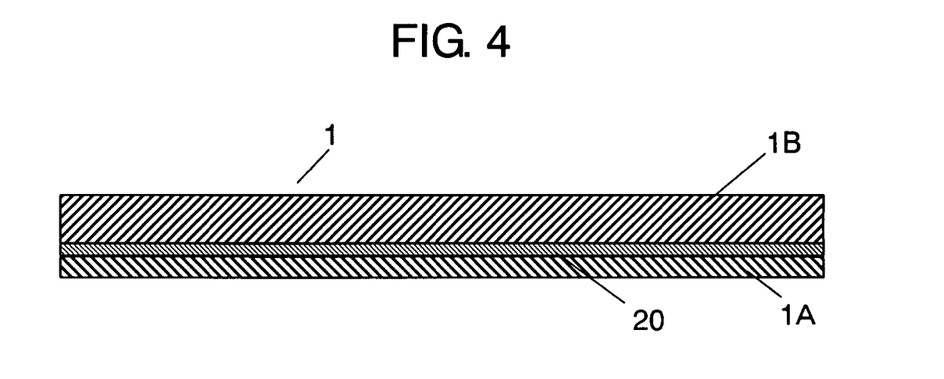
FIG. 4 is a sectional view showing another structure of the negative electrode for non-aqueous electrolyte secondary batteries in accordance with the exemplary embodiment of the present invention.

Alternatively, binding layer 20 where the content of first binder 15 is higher than that in mixture layer 1B may be further disposed between current collector 1A and mixture layer 1B as shown in the sectional view of FIG. 4. For producing a negative electrode having high conductivity, conductive material such as acetylene black is preferably added to binding layer 20. Binding layer 20 is produced, for example as: the conductive material is added into the solvent in which first binder 15 is dispersed; the resulting mixture is stirred to obtain a slurry; and then the slurry is applied to current collector 1A. The above-described negative electrode mixture slurry is applied onto binding layer 20 and dried to produce mixture layer 1B. After that, by rolling negative electrode 1, part of composite negative electrode active material 14 contained in mixture layer 1B can be moved to binding layer 20, so that the content of first binder 15 can be made to be higher near current collector 1A. By any of the methods above mentioned, the content of first binder 15 can be made to be higher near current collector 1A. In this way, silicon-containing particles 11 are more firmly and rightly bound to current collector 1A.

When the content of first binder 15 is less than 1 part by weight with respect to 100 parts by weight of silicon-containing particles 11, repetition of charge-discharge (expansion and contraction) makes loose the binding between mixture layer 1B and current collector 1A and makes mixture layer 1B easy to peel off. In other words, the cycle characteristics are degraded. When the content of first binder 15 exceeds 30 parts by weight with respect to 100 parts by weight of silicon-containing particles 11, first binder 15 excessively covers silicon-containing particles 11. Ion conductivity in the negative electrode is reduced, and the high-load discharge characteristics degrade. Therefore, the content of first binder 15 is preferably 1 part by weight or more and 30 parts by weight or less with respect to 100 parts by weight of the silicon-containing particles.

When the content of second binder 16 is less than 3 parts by weight with respect to 100 parts by weight of CNFs, binding between each assembly of composite negative electrode active material 14 is insufficient in mixture layer 1B, whereby repetition of charge-discharge (expansion and contraction) makes loose the binding between each assembly of the composite electrode active material in mixture layer 1B, and makes each assembly of composite negative electrode active material 14 easy to peel off from mixture layer 1B. In other words, the cycle characteristics are degraded. When the content of second binder 16 exceeds 80 parts by weight with respect to 100 parts by weight of CNFs 12, second binder 16 excessively covers CNFs 12. Conductivity in the negative electrode is reduced, and the cycle characteristics degrade. Therefore, the content of second binder 16 is preferably 3 parts by weight or more and 80 parts by weight or less with respect to 100 parts by weight of CNFs 12. When the mixing ratios of both kinds of binders are set to be in the above-mentioned ranges, a non-aqueous electrolyte secondary battery having high cycle characteristics and high high-load discharge characteristics is obtained.

The advantages of the present invention are hereinafter described using specific experiments and their results. In the following samples 1 to 17, all of the mixing ratios of the binders are represented in terms of solid content.

First, a producing procedure of composite negative electrode active material 14 of sample 1 is described. A predetermined amount of silicon oxide (SiO particles, average particle diameter is 10 μm or less) is admixed in a solution dissolving 1 g iron nitrate nonahydrate in 100 g ion-exchanged water. According to gravimetric analysis (JIS Z2613) for the SiO particles, O/Si molar ratio is 1.01. After the mixture of SiO particles and solution is stirred for one hour, water is removed from it with an evaporator so as to deposit iron nitrate on the surfaces of the SiO particles. The SiO particles loaded with iron nitrate are put in a ceramic reaction vessel and heated to 500° C. in a helium gas atmosphere. Then, the helium gas is replaced by a gas composed of 50 vol % hydrogen gas and 50 vol % carbon monoxide gas, and the SiO particles are heated at 500° C. for one hour so as to grow flat CNFs 12 with a diameter of about 80 nm and a length of about 50 µm. After that, the mixture gas is replaced by helium gas, and the inside of the reaction vessel is cooled to room temperature so as to obtain composite negative electrode active material 14. The content of thus grown CNFs 12 is 25 parts by weight with respect to 100 parts by weight of SiO particles.

Next, a producing procedure of negative electrode 1 of sample 1 is described. A negative electrode mixture slurry is prepared by homogenously mixing and dispersing the following materials:

composite negative electrode active material 14, 100 parts by weight;

aqueous solution containing 1% polyacrylic acid (average molecular weight is 150,000) as first binder 15, 10 parts by weight;

core-shell-type modified SBR as second binder 16, 10 parts by weight; and distilled water, 200 parts by weight.

The mixing ratio of first binder 15 is 13.3 parts by weight with respect to 100 parts by weight of SiO. The mixing ratio of second binder 16 is 40 parts by weight with respect to 100 parts by weight of CNFs 12.

The resulting negative electrode mixture slurry is applied to a 14 µM thick copper (Cu) foil as current collector 1A and dried in a manner that the electrode plate thickness after drying becomes 100 µm. The plate is stamped into a square having sides of 11 mm to obtain negative electrode 1.

A flat model cell is formed of negative electrode 1 thus produced, a square metallic lithium foil having a thickness of 300 µm and sides of 13 mm as counter electrode 2, and a polyethylene microporous film having a thickness of 20 µm and a porosity of about 40% as separator 3. The model cell is inserted into laminate bag 4. After aqueous electrolyte 5 is injected into it, laminate bag 4 is sealed. Aqueous electrolyte 5 is a solution dissolving $LiPF_6$ at a concentration of 1 mol/$dm^3$ in a mixture solvent of ethylene carbonate (EC), dimethyl carbonate (DMC), and ethyl methyl carbonate (EMC) (volume ratio EC: DMC: EMC=2:3:3). The designed capacity (C, in mAh) of the obtained model cell of sample 1 is 5 mAh.

The model cells of samples 2 to 7 are produced similarly to sample 1, except that mixing ratios of polyacrylic acid that is used as first binder 15 in sample 1, with respect to 100 parts by weight of composite negative electrode active material 14, are set at 0.4, 0.7, 3.8, 15, 22.5, and 28 parts by weight, respectively, in producing each composite negative electrode active material 14 and each negative electrode 1 for samples 2 to 7. In samples 2 to 7, mixing ratios of first binder 15 with respect to 100 parts by weight of SiO are 0.5, 1, 5, 20, 30, and 37.3 parts by weight, respectively.

The model cells of samples 8 to 13 are produced similarly to sample 1, except that mixing ratios of BM-400B that is used as binder 16 in sample 1, with respect to 100 parts by weight of composite negative electrode active material 14, are set at 0.4, 0.8, 2.5, 15, 20, and 24 parts by weight, respectively, in producing each composite negative electrode active material 14 and each negative electrode 1 for samples 8 to 13. In samples 8 to 13, mixing ratios of second binder 16 are 1.6, 3, 10, 60, 80, and 96 parts by weight, respectively, with respect to 100 parts by weight of CNFs 12.

In producing sample 14, CNFs 12 are grown on the surfaces of SiO particles similarly to sample 1 except that the reaction time is set at 80 minutes. Extending the reaction time increases the content of CNFs 12 to 30 parts by weight with respect to 100 parts by weight of SiO. The model cell of sample 14 is produced similarly to sample 1, except that 9.5 parts by weight of polyacrylic acid as first binder 15 and 9.5 parts by weight of BM-400B as second binder 16 are added with respect to 100 parts by weight of composite negative electrode active material 14. The mixing ratio of first binder 15 is 13.6 parts by weight with respect to 100 parts by weight of SiO. The mixing ratio of second binder 16 is 40 parts by weight with respect to 100 parts by weight of CNFs 12.

The model cell of sample 15 is produced similarly to sample 1 except that copper foil as current collector 1A is sandblasted and the surface thereof is roughened so that surface roughness Ra is increased from 0.1 µm to 1 µm.

In sample 16, two kinds of negative electrode mixture slurries are used. First slurry of sample 16 is prepared similarly to the negative electrode mixture slurry of sample 1 except that the mixing ratio of polyacrylic acid as first binder 15 is set at 0.7 parts by weight with respect to 100 parts by weight of obtained composite negative electrode active material 14. The mixing ratio of first binder 15 is 1 part by weight with respect to 100 parts by weight of SiO. While, second slurry of sample 16 is prepared similarly to the negative electrode mixture slurry of sample 1 except that the mixing ratio of polyacrylic acid is set at 22.4 parts by weight with respect to 100 parts by weight of composite negative electrode active material 14. The mixing ratio of first binder 15 is 30 parts by weight with respect to 100 parts by weight of SiO. The second slurry is firstly applied to copper foil as current collector 1A so that the thickness after drying is 43 µm to form a lower layer, and the first slurry is then applied to the second slurry so that the thickness after drying is 43 µm to form an upper layer. Except for this condition, the model cell of sample 16 is produced similarly to sample 1.

In sample 17, before mixture layer 1B is formed, binding layer 20 is formed on current collector 1A. In forming binding layer 20, 20 parts by weight of polyacrylic acid as first binder is mixed with 100 parts by weight of acetylene black, and a third slurry is produced using distilled water as a solvent. The third slurry is applied to copper foil as current collector 1A so that the thickness after drying is 5 µm, and the same slurry as the negative electrode mixture slurry used for sample 1 is then applied and dried, thereby forming binding layer 20. In this way, except that binding layer 20 is formed, the model cell of sample 17 is produced similarly to sample 1.

Initial charge capacity and initial discharge capacity of each model cell of samples 1 to 17 thus produced are measured at a charge-discharge current of 0.1 CmA. The discharge capacity thus measured is converted into a value per unit volume (1 $cm^3$) of mixture layer 1B to obtain and discharge capacity density is calculated. The cell is charged until the voltage across the electrodes reaches 0 V, and the cell is discharged until the voltage reaches 1.5 V. Here, 0.1 CmA indicates a current value obtained by dividing the designed capacity of batteries by 10 hours.

The high-load characteristics of each model cell of samples 1 to 17 are then evaluated. Each model cell is charged at a current of 0.1 CmA, and then discharged at a current of 0.5 CmA so as to obtain the discharge capacity at 0.5 CmA. The discharge capacity thus obtained is divided by the discharge capacity at 0.1 CmA to estimate the capacity retention rate, which is used as an index of the high-load characteristics.

Finally, the charge-discharge cycle characteristics are evaluated. Charge and discharge are repeated under the same conditions as the initial capacity measurement. The rest time between each charge and discharge is set at 20 minutes. In the discharge state after five cycles, each model cell of samples 1 to 17 is disassembled, and mixture layer 1B is observed to see whether peeling or separation occurs. The charge-discharge cycle is repeated for each model cell. The cycle number until the discharge capacity reaches 60% of the initial discharge capacity is used as an index of the cycle characteristics of each model cell.

By referring to the case where a negative electrode using graphite as the active material is used, the evaluation standard of the capacity retention rate is set at 60% or more. The evaluation standard of the cycle number is set at 50 cycles or more in consideration of practicality. Table 1 shows the composition of each negative electrode of samples 1 to 17 and evaluation results of the characteristics of each model cell.

adsorption of first binder 15 having a high affinity to current collector 1A, and hence the binding property is further increased and the cycle characteristics are further improved.

In sample 16, the content of first binder 15 having a high affinity to current collector 1A is set higher near current collector 1A, so that peeling of mixture layer 1B from current collector 1A caused by rapid expansion and contraction of SiO is significantly reduced and cycle characteristics are further improved.

In sample 17, binding layer 20 containing first binder 15 is disposed on current collector 1A, and mixture layer 1B is stuck to current collector 1A. Therefore, cycle characteristics are further improved similarly to sample 16.

In sample 14, composition of CNFs 12 and SiO of silicon-containing particles 11 in composite negative electrode active material 14 is changed. In this case, by making adequate the

TABLE 1

|  | SiO weight proportions | CNF weight proportions | Added first binders (parts by weight to SiO) | Added second binders (parts by weight to CNF) | Others | Cycle numbers | High-bad capacity retention rates (%) |
|---|---|---|---|---|---|---|---|
| Sample 1 | 100 | 25 | 13.3 | 40 |  | 65 | 82 |
| Sample 2 | 100 | 25 | 0.5 | 40 |  | 8 | 61 |
| Sample 3 | 100 | 25 | 1 | 40 |  | 52 | 86 |
| Sample 4 | 100 | 25 | 5 | 40 |  | 57 | 85 |
| Sample 5 | 100 | 25 | 20 | 40 |  | 61 | 84 |
| Sample 6 | 100 | 25 | 30 | 40 |  | 57 | 81 |
| Sample 7 | 100 | 25 | 37.3 | 40 |  | 53 | 70 |
| Sample 8 | 100 | 25 | 13.3 | 1.6 |  | 16 | 64 |
| Sample 9 | 100 | 25 | 13.3 | 3 |  | 54 | 81 |
| Sample 10 | 100 | 25 | 1.3 | 10 |  | 55 | 91 |
| Sample 11 | 100 | 25 | 13.3 | 60 |  | 59 | 92 |
| Sample 12 | 100 | 25 | 13.3 | 80 |  | 56 | 83 |
| Sample 13 | 100 | 25 | 13.3 | 96 |  | 54 | 58 |
| Sample 14 | 100 | 30 | 13.3 | 40 |  | 53 | 82 |
| Sample 15 | 100 | 25 | 13.3 | 40 | Current collector with rough surface | 61 | 84 |
| Sample 16 | 100 | 25 | Lower layer: 30 Upper layer: 1 | Both lower and upper layers: 40 |  | 64 | 81 |
| Sample 17 | 100 | 25 | 13.3 | 40 | Existence of binding layer | 60 | 83 |

As is clear from Table 1, the model cells of samples 1 to 17 using negative electrodes that contain first binder 15 composed of an acryl-group-containing polymer and second binder 16 composed of adhesive rubber particles have sufficient high-load discharge characteristics and sufficient cycle characteristics. Most of all, the model cells of sample 1, samples 3 to 6, samples 9 to 12, and samples 14, 15, 16 and 17 having negative electrodes that contain the first binder and second binder at an adequate mixing ratio, exhibit excellent high-load discharge characteristics and excellent cycle characteristics. Further, exhibit especially excellent characteristics the model cells of samples 1, 4, 5, 10 and 11, in which the content of first binder 15 is 5 parts by weight or more and 20 parts by weight or less with respect to 100 parts by weight of SiO, and the content of second binder 16 is 10 parts by weight or more and 60 parts by weight or less with respect to 100 parts by weight of CNFs 12.

In sample 15 having current collector 1A with a roughened surface, current collector 1A has an increased area for the mixing ratio of first binder 15 to SiO and the mixing ratio of second binder 16 to CNFs 12, a negative electrode for non-aqueous electrolyte secondary batteries having excellent cycle characteristics and excellent high-load discharge characteristics is also obtained.

In sample 2 where the content of first binder 15 is less than 1 part by weight with respect to 100 parts by weight of SiO, the cycle characteristics are low. This is probably because repetition of charge and discharge (expansion and contraction) makes loose the binding between mixture layer 1B and current collector 1A and makes mixture layer 1B easy to peel off. When the model cell is disassembled and inspected after evaluating the characteristics thereof, peeling is actually observed. In sample 7 where the content of first binder 15 exceeds 30 part by weight with respect to 100 parts by weight of SiO, the high-load discharge characteristics are low. That is probably because excessively covering silicon-containing particles 11 with first binder 15 reduces the ion conductivity.

In sample 8 where the content of second binder 16 is less than 3 parts by weight with respect to 100 parts by weight of CNFs 12, the cycle characteristics are also low. This is probably because repetition of charge and discharge (expansion and contraction) makes loose the binding in mixture layer 1B and makes composite negative electrode active material 14 easy to peel off. When the model cell is disassembled and inspected after evaluating the characteristics thereof, peeling is actually observed. In sample 13 where the content of second binder 16 exceeds 80 part by weight with respect to 100 parts by weight of CNFs 12, the high-load discharge characteristics are also low. This is probably because excessively covering CNFs 12 with second binder 16 reduces the electrical conductivity.

The advantages of the present invention have been described with reference to specific experiments using the model cells having a structure of FIG. 1 and their results. However, when a positive electrode capable of charging and discharging lithium ions is used instead of metallic lithium used as counter electrode 2, a laminate type non-aqueous electrolyte secondary battery sealed in laminate bag 4 can be obtained. The positive electrode has a mixture layer containing, as a positive electrode active material, a lithium-containing compound such as $LiCoO_2$, $LiNiO_2$, $Li_2MnO_4$, a mixture of them, or a composite oxide of them. Such a positive electrode active material reduces lithium ions at least during discharge, and contains lithium ions in an uncharged state. In a structure where negative electrode 1 does not contain lithium in an uncharged state, the positive electrode needs to contain lithium ions as in the present case. When negative electrode 1 having the structure as described above is used in a non-aqueous electrolyte secondary battery having this structure, a battery having sufficient high-load characteristics and sufficient cycle characteristics is achieved.

Specific examples of the positive electrode active material include, in addition to the lithium-containing composite oxides mentioned above, lithium-containing compounds such as olivine-type lithium phosphate expressed by a general formula: $LiMPO_4$, where M=V, Fe, Ni, or Mn, and lithium fluorophosphate expressed by a general formula: $Li_2MPO_4F$, where M=V, Fe, Ni, or Mn. It is also possible to replace part of the constituent elements of these lithium-containing compounds by a different element. The surfaces of these lithium-containing compounds may be treated with metal oxide, lithium oxide, a conductive agent or the like, or may be subjected to hydrophobic treatment.

Specific examples of the conductive agent to be used for the positive electrode include the following materials: graphites such as natural graphite and artificial graphite; carbon blacks such as acetylene black, Ketjen black, channel black, furnace black, lamp black, and thermal black; conductive fibers such as carbon fiber and metal fiber; metal powders such as aluminum powder; conductive whiskers such as zinc oxide whisker and potassium titanate whisker; conductive metal oxides such as titanium oxide; and organic conductive materials such as a phenylene derivative.

Specific examples of the binder for the positive electrode include polyvinylidene fluoride (PVDF), polytetrafluoroethylene, polyethylene, polypropylene, aramid resin, polyamide, polyimide, polyamideimide, polyacrylonitrile, polyacrylic acid, polymethylacrylate ester, polyethylacrylate ester, polyhexylacrylate ester, polymethacrylic acid, polymethyl methacrylate ester, polyethylmethacrylate ester, polyhexyl methacrylate ester, polyvinyl acetate, polyvinylpyrrolidone, polyether, polyethersulfone, hexafluoropolypropylene, styrene-butadiene rubber, and carboxymethyl cellulose. Further other examples of the binder include copolymers containing at least two selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. Alternatively, two or more of these copolymers can be mixed.

The current collector and the lead used for the positive electrode can be made of stainless steel, aluminum, titanium, carbon, conductive resin, or the like. These materials may be surface-treated with carbon, nickel, titanium or the like.

The structure of the battery is not limited to the aforementioned laminate-type battery structure in which rectangular positive and negative electrode plates face each other. A coin-shaped battery structure where circular positive and negative electrode plates face each other, a cylindrical battery structure where thin and long positive and negative electrodes are wound, or a prismatic battery structure can be used. Any of these structures provides the same advantages as the laminate-type battery structure. Coin-shaped batteries do not always need current collector 1A, and mixture layer 1B may be formed directly on the inner surface of a metal case which is made of iron, nickel-plated iron, or the like and also serves as an external terminal. Furthermore, instead of using a wet process of handling negative electrode mixture slurry, the composite negative electrode active material may be mixed with a powdered binder and then pressed.

INDUSTRIAL APPLICABILITY

A negative electrode for non-aqueous electrolyte secondary batteries related to the present invention can provide a high-capacity non-aqueous electrolyte secondary battery having improved high-load discharge characteristics and cycle characteristics. The negative electrode contributes to the increase in energy density of lithium batteries expected to have growing demand.

The invention claimed is:

1. A negative electrode for a non-aqueous electrolyte secondary battery, the negative electrode comprising:
   a current collector; and
   a mixture layer electrically coupled to the current collector, the mixture layer including:
      a composite negative electrode active material containing:
         a silicon-containing particle capable of charging and discharging at least a lithium ion;
         a carbon nanofiber attached to a surface of the silicon-containing particle; and
         at least one catalyst element selected from a group including Cu, Fe, Co, Ni, Mo, and Mn, the catalyst element promoting growth of the carbon nanofiber;
      a first binder containing an acryl-group-containing polymer; and
      a second binder containing an adhesive rubber particle,
         wherein the first binder binds the silicon-containing particle to the current collector, and the second binder is a core-shell copolymer and binds the carbon nanofibers together, and
   content of the first binder is higher near the current collector than in another part in the mixture layer.

2. The negative electrode for the non-aqueous electrolyte secondary battery of claim 1, wherein
   a surface of the current collector is roughened.

3. The negative electrode for the non-aqueous electrolyte secondary battery of claim 1, the negative electrode further comprising a binding layer between the current collector and the mixture layer, content of the first binder in the binding layer being higher than that in the mixture layer.

4. The negative electrode for the non-aqueous electrolyte secondary battery of claim 1, wherein
a mixing ratio of the first binder is 1 part by weight or more and 30 parts by weight or less with respect to 100 parts by weight of the silicon-containing particle, and
a mixing ratio of the second binder is 3 parts by weight or more and 80 parts by weight or less with respect to 100 parts by weight of the carbon nanofiber.

5. A non-aqueous electrolyte secondary battery comprising:
the negative electrode for the non-aqueous electrolyte secondary battery of claim 1;
a positive electrode capable of charging and discharging a lithium ion; and
a non-aqueous electrolyte interposed between the negative electrode and the positive electrode.

* * * * *